(12) United States Patent
Fleischanderl et al.

(10) Patent No.: US 7,658,897 B2
(45) Date of Patent: Feb. 9, 2010

(54) PROCESS AND APPARATUS FOR TREATING FLUE GAS FROM SINTERING PLANTS

(75) Inventors: Alexander Fleischanderl, Grünau (AT); Robert Neuhold, Villach (AT)

(73) Assignee: Siemens VAI Metals Technologies GmbH & Co. (AT)

( * ) Notice: Subject to any disclaimer, the term of this patent is extended or adjusted under 35 U.S.C. 154(b) by 24 days.

(21) Appl. No.: 11/909,580

(22) PCT Filed: Mar. 8, 2006

(86) PCT No.: PCT/EP2006/002111

§ 371 (c)(1),
(2), (4) Date: Nov. 27, 2007

(87) PCT Pub. No.: WO2006/099948

PCT Pub. Date: Sep. 28, 2006

(65) Prior Publication Data
US 2008/0175775 A1      Jul. 24, 2008

(30) Foreign Application Priority Data
Mar. 24, 2005   (AT)   ................. A 511/2005

(51) Int. Cl.
*B01D 53/46*   (2006.01)
*B01J 19/08*   (2006.01)
*F26B 7/00*   (2006.01)
(52) U.S. Cl. .................. 423/210; 422/186.1; 34/374
(58) Field of Classification Search .............. None
See application file for complete search history.

(56) References Cited

U.S. PATENT DOCUMENTS

| | | | |
|---|---|---|---|
| 5,227,356 A | 7/1993 | Hess et al. | |
| 5,620,673 A * | 4/1997 | Herden et al. | ............ 423/240 S |
| 5,659,110 A | 8/1997 | Herden et al. | |
| 5,667,582 A * | 9/1997 | Ziegler et al. | ............... 106/761 |
| 6,913,457 B2 * | 7/2005 | Penfornis et al. | ............... 431/8 |

(Continued)

FOREIGN PATENT DOCUMENTS

DE   2520045   11/1976

(Continued)

OTHER PUBLICATIONS

International Preliminary Report on Patentability in German dated May 3, 2007 issued in corresponding PCT Application No. PCT/EP2006/002111.

(Continued)

*Primary Examiner*—Melvin C Mayes
*Assistant Examiner*—Sheng Han
(74) *Attorney, Agent, or Firm*—Ostrolenk Faber LLP

(57) ABSTRACT

The invention reveals a process and an apparatus for treating flue gas from sintering plants, in which dry additive consisting at least of adsorbent and recirculated material is added by the entrained-flow process to the flue gas from a sintering plant in a flue gas duct, and the additive is then separated out of the flue gas by fabric filters and at least partially recirculated. In this context, it is provided that additive is introduced at least one location in the opposite direction to the direction of flow of the flue gas.

20 Claims, 1 Drawing Sheet

U.S. PATENT DOCUMENTS

| | | | |
|---|---|---|---|
| 7,047,748 B2* | 5/2006 | Zauderer | 60/775 |
| 2002/0025285 A1* | 2/2002 | Comparato et al. | 423/235 |
| 2004/0120874 A1* | 6/2004 | Zauderer | 423/242.1 |
| 2006/0099902 A1* | 5/2006 | Kikkawa et al. | 454/3 |

FOREIGN PATENT DOCUMENTS

| | | |
|---|---|---|
| DE | 4105510 | 5/1992 |
| DE | 19623981 | 1/1998 |
| DE | 19651822 | 6/1998 |
| DE | 20210008 | 11/2002 |
| EP | 0908222 | 4/1999 |
| WO | WO 2004/023040 * | 3/2004 |

OTHER PUBLICATIONS

English Translation of International Preliminary Report on Patentability dated May 3, 2007 issued in corresponding PCT Application No. PCT/EP2006/002111.

International Search Report dated Jun. 19, 2006 issued in corresponding PCT Application No. PCT/EP2006/002111.

Elmar Schuster, Johann Zimgast, Hubert Zeller and Johann Pössler, "Improved flue-gas cleaning by bag filter at the sinter Strand of voestalpine Stahl Donawitz", 3rd International Conference on Science and Technology of Iron Making (ICSTI), Jun. 16-20, 2003, METEC Dusseldorf, pp. 574-577.

* cited by examiner

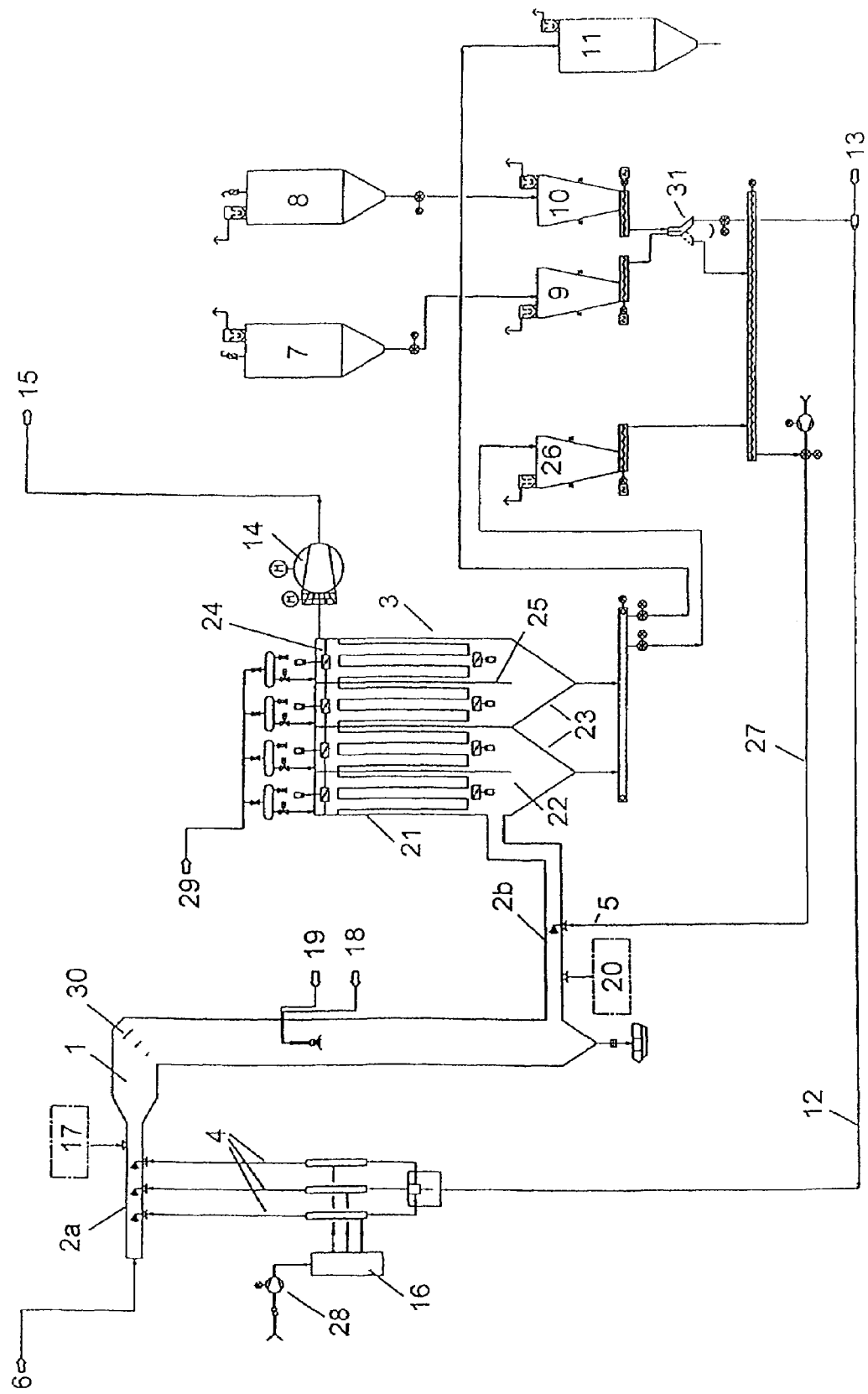

PROCESS AND APPARATUS FOR TREATING FLUE GAS FROM SINTERING PLANTS

CROSS REFERENCE TO RELATED APPLICATION

The present application is a 35 U.S.C. §§ 371 national phase conversion of PCT/EP2006/002111, filed Mar. 8, 2006, which claims priority of Austrian Application No. A 511/2005, filed Mar. 24, 2005, the disclosure of which has been incorporated herein by reference. The PCT International Application was published in the German language.

The invention relates to a process and an apparatus for treating flue gas from sintering plants, in which dry additive consisting at least of adsorbent and recirculated material is added by the entrained-flow process to the flue gas from a sintering plant in a flue-gas duct, and the additive is then separated out of the flue gas by fabric filters and at least partially recirculated.

Suitable sintering plants are in particular sintering plants for iron ores, in which case the sintered ores are used in steel making.

The term entrained-flow process is to be understood as meaning processes in which additive is added to a flue gas stream flowing in a predetermined direction, the additive is entrained with the flue gas stream and as it is transported reactions occur between additive and constituents of the flue gas. This is distinct from a fluidized-bed process, in which the flue gas is fluidized in a reactor and therefore does not flow in a predetermined direction.

In the entrained-flow process, the mean residence time of the additive in the flue gas duct is a few seconds. By way of example, in the plant shown in the FIGURE, it will be about two seconds for additive from the introduction location 5, approximately ten seconds for additive from the introduction location 4. The mean residence time of additive in the fluidized-bed process is longer.

The solids loading in the entrained-flow process is between 1 and 50 g/m$^3$ (s.t.p.) (with the level of fresh additive, i.e. adsorbent and if appropriate reagent, being between 100 and 3000 mg/m$^3$ (s.t.p.)) and is therefore considerably lower than in a fluidized-bed process, where the quantity of solids is approximately 20-50 times that used in the entrained-flow process.

The term fabric filter is intended to encompass bag filters, pocket filters, cloth filters, textile filters and filters made from metallic fabric.

Nowadays, environmental authorities inspecting integrated iron and steel works are focusing most of their attention on the sintering plants. The reason for this is that sintering plants are responsible for a considerable proportion of pollutants emissions from an integrated iron and steel works, on account of the huge quantities of flue gas (usually 300000-1000000 m$^3$/h (s.t.p.)). In particular fine dusts and aerosols (salts) and heavy metals (Hg, Pb, Cd), organic emissions, such as dioxins/furans, VOC, PAC and acidic components, such as sulphur dioxide/trioxide, HCl and HF represent possible sources of problems.

The publication "Improved flue-gas cleaning by bag filter at the sinter strand of voestalpine Stahl Donawitz", by Elmar Schuster, Johann Zirngast, Hubert Zeller and Johann Pössler, 3rd International Conference on Science and Technology of Iron Making (ICSTI), 16-20 Jun. 2003, METEC Dusseldorf, pages 574-577, has disclosed a process and an apparatus in which flue gas from a sintering plant is passed through a flue gas duct and what is described as a ball rotor, a cylindrical drum formed from a perforated plate in which ceramic balls are contained. Screw conveyors are used to feed additive, namely fresh additive and recirculated material, into this drum, so that the flue gas is enriched with the additive dust as it passes through the ball rotor. Reactions between additive and gas constituents take place in the subsequent reactor before the additive dust in the flue gas is separated out at bag filters. However, only a very limited reaction takes place in the entrained flow, since the relative velocity between flue gas and additive is low. The additive distribution is also not very homogeneous.

Therefore, it is an object of the present invention to improve the known processes and apparatuses in such a way as to increase the reaction rate between flue gas and additive.

The object may be achieved by a process for treating flue gas from a sintering plant, the flue gas having a direction of flow, the process comprising: introducing at least two different introduction points along the flue gas duct dry additive comprising at least an adsorbent and recirculated material by an entrained-flow process in a flue-gas duct; and separating out of the flue gas by a fabric filter and at least partially recirculating the flue gas, wherein the dry additive is introduced at least one location in a direction opposite to the direction of flow of the flue gas.

This object may also be achieved by a flue gas treatment apparatus for introducing a dry additive to the flue gas of a sintering plant, the apparatus comprising: a flue gas duct configured to be connected to the sintering plant and including a widened section at a portion thereof the widened section having a diameter greater than remaining portions of the flue gas duct; a second feed device configured to introduce the dry additive into a stream of the flue gas flowing in a direction in the flue gas duct; a fabric filter positioned at an opening of the flue gas duct and configured to separate out at least a recirculating portion of the dry additive; a returning device positioned and configured to return the recirculating portion of the dry additive to the flue gas duct, wherein the first feed device is positioned upstream of the widened section in the flue gas duct along the flowing direction and the second feed device is positioned downstream of the widened section in the flue gas flowing direction, and wherein the first and second feed devices are positioned and configured such that the dry additive is introduced in a direction opposite to the direction of the flow of the flue gas. Further advantageous configurations of the invention are also provided.

On account of the fact that additive is introduced in the opposite direction to the direction of flow of the exhaust gas at least one location, the relative velocity between flue gas and additive is increased, and as a result the reaction rate between additive and flue gas is also increased. In this context, a relative velocity of at least 30 m/s between additive and flue gas is particularly effective.

If it is provided that additive is introduced at a plurality of locations along the direction of flow of the flue gas, it is possible to in each case add smaller quantities of additive, which can be distributed better than if one large quantity of additive is added all at once. In particular, it is possible to provide that additive is introduced upstream and downstream of a widened section of the flue gas duct, since the gas velocity is higher there than in the widened section.

One configuration of the invention consists in additive being introduced, at least in a defined cross section of the flue gas duct, at a plurality of locations distributed over the cross section. This allows a more homogeneous distribution of the additive over the cross section of the flue gas duct and therefore better utilization of the additive to be ensured, so that the additive is uniformly consumed and it is not the case that the additive is completely consumed in some regions of the flue gas duct cross sections and is incompletely consumed at other regions.

It is advantageous if the additive is introduced via at least one lance. A lance is a slender tube through which the additive is introduced into the flue gas. The tube may, for example, project into the flue gas duct perpendicular to the surface of the latter and then be bent in the opposite direction to the direction of flow of the flue gas at the end.

The additive at least contains adsorbent, such as coke or activated carbon, and may additionally contain reagent, such as lime or lime hydrate. The adsorbent can bind polluting components, such as heavy metals and organic substances, by adsorption, and the reagent can be used to separate out acidic components, such as $SO_2$, $SO_3$, HCl, HF.

It is also advantageous if recirculated material and fresh adsorbent/reagent are introduced at different locations. This enables the quantities to be altered independently of one another, which leads to better utilization of the additive. Polluting gas peaks can be dealt with more successfully in this way, since adsorbent and if appropriate reagent can be supplied in a targeted and metered manner.

In this context, it is particularly advantageous if adsorbent and/or reagent is introduced before recirculated material. As a result, the fresh adsorbent and/or reagent comes into contact with flue gas that has not yet been purified and has a high pollutant concentration, whereas the recirculated material, which has already partially reacted, comes into contact with the flue gas which has already been partially purified and therefore has a lower pollutant content.

In particular, it is possible to provide that adsorbent is introduced as a function of the level of the condensable organic compounds and/or the level of the heavy metals, and/or that reagent is introduced and/or the flue gas is cooled and/or humidified as a function of the level of the acidic constituents (in particular sulphur dioxide) in the flue gas.

The flue gas can be conditioned by the flue gas being cooled and/or humidified in a controlled way by injection or atomization of water into the flue gas stream independently of the addition of additive.

If it is provided that the water is introduced with a defined maximum drop size, it is possible to ensure that the water evaporates within a defined distance, in particular prior to the next diversion of gas or changing cross section of the flue gas duct. Caking caused by accumulation of water on the walls of the flue gas duct is thus avoided. In this context, a maximum drop diameter of less than 200 μm has proven advantageous.

As an alternative to the injection or atomization of water, it is possible to provide that the flue gas is cooled and/or humidified in a controlled manner by injection of suspension/solution, such as a suspension of lime hydrate in water, into the flue gas stream in a widened section of the flue gas duct. There is then no longer any need to add reagent as dry additive. In terms of the drop size, the same conditions apply as for water.

If it is provided that additive, in particular reagent, is added to the flue gas prior to the injection of water, it is possible to increase the chemisorption, in particular the desulphurization capacity, by means of the film of water at the gas/solid interface, since this improves the mass transfer.

The invention is explained with reference to the accompanying FIGURE, which shows an apparatus according to the invention, illustrated diagrammatically and by way of example, and with reference to the following description.

The flue gas 6 is introduced into the flue gas duct 2a from a sintering plant, advantageously via an electrostatic filter and a process gas blower. The reduced pressure which is required for the treatment of the flue gases (pressure loss from the plant according to the invention) is ensured by an ancillary blower 14. The flue gas duct 2a, which serves as an entrained-flow reactor, widens after a horizontal portion to form a gas conditioner 1. The length and diameter of the latter are dimensioned such that water supplied via the water feed 18 in drop form with a defined maximum diameter can as far as possible evaporate within the gas conditioner 1. It is important that the drops should evaporate prior to the next gas diversion. The flue gas is guided vertically downwards in the gas conditioner 1. The narrowed flue gas pipe 2b serving as entrained-flow reactor continues horizontally from the lower end of the gas conditioner 1 and ultimately opens out into the fabric filter 3. Of course, the flue gas pipe 2a, 2b does not have to be horizontally oriented, and likewise the gas conditioner 1 does not have to be strictly vertically oriented, but should expediently have a vertical direction component. The widening and diversion of the flue gas duct 2a, 2b is dimensioned in such a way as to achieve a substantially laminar directed flow, as to prevent caking and back-flow and to achieve a homogeneous velocity distribution over the cross section. The measures required to achieve this will be familiar to a person skilled in the art; by way of example, it is possible to provide metal diverter sheets 30.

Fresh additive is on the one hand introduced as reagent into the silo 7 and stored there, and on the other hand introduced as adsorbent into the silo 8 and stored. The material is taken off from the silos 7, 8 via star feeders which deliver the material into the respective metering containers 9, 10. These metering containers are weighed and equipped with level sensors.

The adsorbent or reagent introduced into the metering containers 9, 10 is introduced with quantitatively accurate control, via metering screws, into a common feed line 12 when the rotary chute 31 is directed to the right, and replaces the consumed adsorbent and reagent, which is discharged via the residual material discharge into the residual material silo 11. In the feed line 12, the adsorbent and reagent are delivered to the feed devices 4 by means of compressed air 13. There, it is fed by means of dilution air of a dilution air blower 28, via the air distributor 16, to the lances of the feed devices 4, which open out into the entrained-flow reactor 2a of the flue-gas duct. The adsorbent and reagent are injected in countercurrent at a high relative velocity. The flue gas velocity at this point is approximately 15-25 m/s, the injection velocity is 15-50 m/s, so that a relative velocity of 30-75 m/s, in particular 40-60 m/s is achieved.

If the rotary chute 31 is directed to the left, adsorbent and reagent together with recirculated material are fed into the feed line 27 and can therefore also be introduced jointly into the entrained-flow reactor 2b (or via feed device 17 into 2a).

In this example, the adsorbent is dry hearth furnace coke (referred to by its German abbreviation HOK) with a bulk density of approximately 0.55 g/cm$^3$ and a grain size distribution of $d_{90}$ approximately 50 μm.

The reagent is in this example dry lime hydrate with a bulk density of approximately 0.5 g/cm$^3$ and a grain size distribution of $d_{90}$ approximately 50 μm.

A feed device 17 for supplying recirculated material is optionally provided downstream of the feed devices 4.

The gas conditioner 1 is used on the one hand to cool the flue gas stream in the event of temperature peaks (gas conditioning), in order not to expose the filter bags of the fabric filter 3 to an excessively high temperature, and on the other hand as a reaction space for adsorption and chemisorption reactions. The dimensions of the reactor are such that particles substantially cannot settle and thereby be entrained with the flue gas to the fabric filter 3, but on the other hand a sufficient residence time for a good adsorption/sorption reaction is guaranteed.

A stable temperature/humidity in the conditioned gas stream is achieved by injection of water, suspension (lime hydrate/water) or solution via the water feed 18 and the compressed-air feed 19 in co-current with the flue gas. The introduction may, as illustrated in the FIGURE, be effected via 2-fluid nozzles or else via a rotary atomizer. Single-fluid nozzles can also be used, but these cause a large drop diameter, and consequently single-fluid nozzles could alternatively be used for very hot flue gas.

If suspension/solution which contains a reagent is introduced, the additive which is added in dry form may contain only adsorbent without any reagent.

In the case of 2-fluid nozzles, the water/suspension/solution is entrained in a mist of ultrafine droplets by a medium (compressed air, nitrogen or steam). The droplets produced must be so fine that even the largest droplets produced evaporate as completely as possible within the predetermined evaporation distance (=by the end of the gas conditioner 1 or the next diversion), since otherwise caking (salts, etc.) is to be expected in diversions, etc. A control (by means of the gas pressure) comprises ensuring a maximum drop diameter and a constant conditioning temperature of the gas stream. The maximum drop diameter is preferably between 50 and 200 μm, in particular between 100 and 150 μm.

In the case of rotary atomizers, the water/suspension/solution is atomized, on a fast-rotating rotary atomizer, into ultrafine droplets which evaporate as completely as possible within the evaporation space (evaporation distance). Rotary atomizers involve higher investment costs but are more suitable for the introduction of suspension/solution; the introduction of suspension/solution is preferred for high separation rates for the acidic components (e.g. desulphurization up to 98%).

The separate introduction of water or suspension/solution, on the one hand, and additive, on the other hand, according to the invention is a superior option to wetting the recirculated material; this wetting is limited, since the recirculated material is conveyed mechanically or pneumatically and therefore has to be able to flow and must not be prone to caking. Since the quantity of recirculated material is usually kept constant under operating conditions, the quantity of water which can be introduced to condition the flue gas stream is also limited (3-4% of the mass flow of recirculated material). Therefore, the conditioning temperature cannot be kept constant (=controlled). In the event of temperature peaks in the untreated gas, the conditioning temperature also rises accordingly. A higher temperature or lower humidity in the gas stream influences the desulphurization behaviour (chemisorption behaviour) and the adsorption behaviour for the polluting components. Emissions peaks result. For this reason, the quantity of recirculated material which is passed through the circuit would also have to be selected at a correspondingly high level, which entails high investment and operating costs. In addition, wetting the recirculated material, on account of the high chloride content of the recirculated material, would lead to corrosion phenomena, requiring the use of expensive materials.

Immediately downstream of the gas conditioner 1, recirculated material is introduced into the flue gas stream, in the in this case horizontal piece of the flue gas duct 2b, via the addition device 5, in the opposite direction to the direction of the flue gas stream. In this case too, a relative velocity of 30-75 m/s, in particular 40-60 m/s is achieved. A feed device 20 for supplying fresh adsorbent and if appropriate reagent is optionally provided upstream of the feed device 5.

Then, the flue gas passes into the fabric filter 3. The main purpose of the fabric filter is to separate out the solids carried along with the flue gas. These solids comprise sintering dust, reaction product, unused reagent, adsorbent and recirculated residual material.

To ensure that the very fine dust fractions and organic flue gas components do not penetrate into the actual filter cloth, accumulate there and thereby cause the pressure loss to rise very quickly (depth filtration—leads to saturation of the bags), the filter cloth is equipped with a fine-pore plastic membrane or coating or an impregnation, with the result that the dust particles are deposited at the surface and build up a filter cake which subsequently performs the actual filtration action (=surface filtration).

The filter cloth must also have the following properties:
  resistance to hydrolysis, since the flue gases have a high moisture content of 5-15%,
  resistance to acidic components (HCl, HF, $SO_2/SO_3$) and basic components (lime)
  resistance to organic components
  resistance to oxidation (oxygen content)
  ability to retain sub-micron particles (<1 μm, e.g. KCl)
  ability to withstand high temperatures (operating and peak temperature up to 200° C.).

Hygroscopic and sticky dusts can be dealt with, since to limit the flue gas humidity the critical parts of the technological installation are additionally heated, and as a result kept at a temperature greater then 100° C.

By way of example, glass fibre fabric with a PTFE (polytetrafluoroethylene) coating or aramid with a PTFE coating is used for the filter fabric.

To ensure that a certain auxiliary filter layer of this type is present even before the first exposure to flue gas, the fabric filter 3 is pre-coated with auxiliary substances, e.g. a lime/activated carbon mixture with additives, known for example under the trade name Sorbalit®. This layer also binds moisture which condenses out of the flue gas during the start-up process, and thereby prevents damage to the filter cloth. A device for introducing material for the pre-coating is provided but not illustrated in the FIGURE.

The fabric filter 3 used substantially comprises the filter housing 21 with the filter bags, the untreated gas chamber 22, the discharge funnels 23 and the purified gas chamber 24.

The dust-laden flue gas passes via the untreated gas entry duct into the untreated gas chamber 22. In the process, the gas velocity is reduced and the dust particles are distributed uniformly at the gas distributor wall 25. The gas path is blocked by the head plate (bag base), so that the entire gas stream can only pass through the filter bags via purified gas flap and purified gas chamber 24 to the purified gas line 15, which leads to the stack.

The dust adheres to the filter bags, onto which it flows from the outside, and forms the filter cake. The latter is responsible for the actual filtering effect. As the dust loading of the bags increases, the filter resistance which is to be overcome also increases continuously. To keep this resistance at an economic level, the filter media have to be cleaned from time to time. This is done with the aid of the cleaning system. Compressed air 29 passes from a compressed-air distribution pipe via a pilot-controlled valve into the blowing pipes assigned to each series of bags, so that each bag is cleaned uniformly. The adhering dust layer is substantially blown off by short, regular compressed-air pulses, boosted by an additional Venturi injector. Venturi nozzles and blowing-pipe nozzles are used to optimize the compressed-air consumption. An inner supporting basket is responsible for keeping the filter bag in shape. During the cleaning of the filter bags, the dust drops between the filter bags into the discharge funnels 23, from where it is continuously extracted by means of discharge members. Vibrators at the funnel wall facilitate the discharge of dust.

Some of the dust is removed and delivered into a residual material silo 11. The majority is recirculated to the entrained-flow reactor 2b. The recirculated material discharged from the fabric filter 3 by means of mechanical conveyors is fed via a metering system 26 by means of screw conveyors to the feed line 27 for recirculated material. The recirculated material is transported with carrier air to the lances of the feed device 5, where it is blown back into the flue gas stream. The carrier air is generated by a carrier air blower. A constant flow of material is ensured by the metering system 26.

The recirculated material is dry and has a bulk density of approx. 0.5 g/cm$^3$ and a grain size distribution of d$_{90}$ approximately 50 μm.

As a result of the recirculation, the fractions of unreacted reagent which can still be utilized in the residual material, as well as the adsorbent which is only laden to a small extent also return to the circuit and the fabric filter 3. This reduces the consumption of reagent and brings about a significant improvement in the removal of pollutants by adsorption through increasing the concentration of adsorbent in the flue gas.

To achieve a homogeneous distribution over the entire flue gas cross section, the recirculated material is injected in countercurrent at a high relative velocity.

However, the recirculation of fabric filter dust also brings about an improved separation of the fine dusts at the fabric filter 3. The sub-micron dust grains have already been coagulated. Accordingly, the mean grain diameter of the particles to be separated out increases.

The pollutants are separated out in the entrained-flow process as follows: the adsorbent takes up organic components and heavy metals. During the removal of acidic components, the reagent partially reacts with these constituents by adsorption (chemisorption) in the entrained flow. By way of example, during the desulphurization, the sulphur dioxide in the flue gas stream partially reacts—when using slaked lime as reagent—to form fine Ca sulphite or gypsum. The following reactions take place:

$$2\,Ca(OH)_2 + 2\,SO_2 \rightarrow 2\,CaSO_3 \cdot \tfrac{1}{2}\,H_2O + H_2O$$

$$2\,CaSO_3 \cdot \tfrac{1}{2}\,H_2O\ O_2 + 3\,H_2O \rightarrow 2\,CaSO_4 \cdot 2\,H_2O \text{ (partial)}$$

$$2\,Ca(OH)_2 + 2\,HCl \rightarrow CaCl_2 \cdot 2\,H_2O$$

$$2\,Ca(OH)_2 + 2\,HF \rightarrow CaF_2 + 2\,H_2O$$

The adsorption (chemisorption) is a process step in which gases are chemically bonded by a solid or a scrubbing liquid. If the flue gas is brought into contact with wet Ca(OH)$_2$, the acidic flue gas constituents SO$_2$, SO$_3$, HCl and HF chemically react with this reagent and form dry solids as a product. These solids are then removed from the flue gas stream in the fabric filter 3.

To achieve the desired separation capacity for the acidic components, it is necessary to meter the reagent and possibly to condition the gas (increasing the humidity). The reagent used is primarily slaked lime.

Adsorption separates out the organic components (dioxins, furans, VOC, PAC) and the heavy metals (predominantly Hg, Cd) contained in the flue gas, by virtue of these substances being bound by adsorption after diffusion into the pore passages. The hearth furnace coke (HOK) used by way of example has an extremely large pore volume and binds these polluting components in the interior of the grain. The adsorption can be boosted further by chemical processes in the pores of the HOK, for example SO$_2$ which is still present in the flue gas reacts to a certain extent to form sulphuric acid or sulphurous acid, with which heavy metals (metallic Hg) in turn react. The HOK is in this case injected together with the reagent and separated out at the fabric filter 3.

Heavy metals pass into the flue gas of the sintering plant via the primary materials (ore and additions) and via recycled material (dusts/slurries). Hg is particularly important, since it is present in both metallic form (vapour) and in salt form. Hg$_2$Cl$_2$(Hg+) can disproportionate into Hg(0) and Hg(2+) on contact with water (depending on redox potential). Hg(0) can only be bound by adsorption. Hg(2+) is present as a salt in particle form. Hg can be measured continuously in the gas stream. By way of example, emission peaks or excessive emission levels can be prevented by adapting the metering of the adsorbent.

Organic compounds (VOC=volatile organic compounds & PAC=polyaromatic compounds) originate from the incompletely burnt compounds of the reducing agent used that are present in the sintering mixture, burners (ignition hood, gas reheating, etc.) or reutilized residual materials (dusts/slurries/scale). The condensable organic compounds in this gas mixture can condense on/in the filter material of the fabric filter 3 and cause irreversible damage to the filter material (reduction in the gas permeability, increase in the specific pressure loss, associated reduction in gas throughput, more frequent cleaning etc.). A shorter service life of the filter material results, leading to increased operating costs.

To eliminate these drawbacks, it is expedient for the concentration of condensable organic components in the gas stream to be measured regularly upstream and/or downstream of introduction of the adsorbent. It is in this way possible to adapt the quantity of adsorbent required to the abovementioned loading, i.e. the amount of adsorbent, fresh or from recirculated material, required is such that the proportion of the organic fractions which can be condensed under operating conditions is substantially bound to the adsorbent. This allows the service life of the filter material to be considerably increased.

For this purpose, it is advantageous to provide a control unit which can be used to control the quantity of water, suspension or solution, the quantity of recirculated material and the quantity of fresh additive independently of one another, specifically as a function of the condition of the untreated and/or purified flue gas (the untreated gas and purified gas). The condition of the flue gas may include temperature, humidity and level of various pollutants.

Depending on the pollutant, other mechanisms may also dominate the adsorption processes. These depend on the physicochemical properties of the components, such as for example the molecule diameter. Correspondingly, the adsorbent to be used also has to be adapted accordingly (distribution of the pores/passage diameter).

The additive (reagent and adsorbent) is injected via an injector, i.e. lances fed with carrier air, in countercurrent to the direction of the flue gas, immediately upstream or downstream of the gas conditioner 1.

An efficient entrained-flow reaction requires a correspondingly homogeneous distribution of the additive in the flue gas stream. Only in this way is it ensured that the pollutant molecules can come into contact (=mass transfer) with the adsorbent/reagent (increase in the probability of them striking one another). This is effected by the fresh additive and the recirculated material (alone or in combination) being injected via a plurality of lances distributed over the cross section, in countercurrent to the flue gas flow. The number of lances depends on the cross section of the gas duct. On account of the resultant high relative velocity of approximately 30-75 m/s, an intensive phase contact is achieved, with the result that the desired binding of the pollutant components is achieved to a considerable extent while still in the entrained flow.

The homogeneous distribution of the additive is also important in order to obtain a homogeneous mixture of primary dust from the sintering plant and additives in the untreated gas chamber 22 of the fabric filter 3. The dust mixture which is deposited on the filter fabric predominantly on account of surface filtration functions as a barrier to the gas that has already been partially purified. The gas has to "diffuse" through this filter layer which is forming. As it does so, it is also forced to come into contact with pollutant molecules and additive grains, resulting in further purification of the flue gas stream. The quantity of recirculated material also accelerates the build-up of a thick filter cake and therefore a sufficient mass transfer action as the flue gas penetrates through the layer. The recirculated material, unlike the dust particles in the untreated gas stream, already comprises coagulated dust grains. Therefore, the mean grain size of the dust mixture which reaches the filter fabric is significantly increased compared to the primary dust. This facilitates separation.

On account of the separation of gas conditioning, recirculated material and/or the introduction of fresh additive, it is possible for the quantities to be altered in a simple way and at any time (since they are not dependent on one another); for example as a function of the pollutant concentration of a component in the purified gas stream.

In the example shown in the FIGURE, 900 mg/m$^3$ (s.t.p.) of reagent is added, and approximately 100 mg/m$^3$ (s.t.p.) of adsorbent is added, so that the total quantity of adsorbent and reagent added is in the range up to 1000 mg/m$^3$ (s.t.p.). The quantity of recirculated material is approximately 10-30 times the quantity of adsorbent plus reagent.

LIST OF DESIGNATIONS

1 Gas conditioner
2a Flue gas duct serving as entrained-flow reactor
2b Flue gas duct serving as entrained-flow reactor
3 Fabric filter
4 Addition device for adding fresh adsorbent/reagent
5 Addition device for adding recirculated material
6 Flue gas
7 Silo for reagent
8 Silo for adsorbent
9 Metering container for reagent
10 Metering container for adsorbent
11 Residual material silo
12 Feed line for additive
13 Compressed air
14 Ancillary blower
15 Purified gas line leading to the stack
16 Air distributor
17 Optional feed device for recirculated material
18 Water feed
19 Compressed-air feed
20 Optional feed device for fresh adsorbent/reagent
21 Filter housing
22 Untreated gas chamber
23 Discharge funnel
24 Purified gas chamber
25 Gas distributor wall
26 Residual material silo
27 Feed line for recirculated material
28 Dilution air blower
29 Compressed air
30 Metal diverter sheets
31 Rotary chute

The invention claimed is:

1. A process for treating flue gas from a sintering plant streaming in a flue gas flowing direction in a flue gas duct including a widened section having a diameter greater than an immediately preceding portion and an immediately following portion of the flue gas duct, the process comprising:
   introducing at a feed position along the flue gas duct away from the widened section dry additive comprising at least an adsorbent;
   feeding recirculated material to the flue gas duct at a recirculation feed position, the recirculated material being dry additive separated out of the flue gas by a fabric filter and at least partially recirculated to the flue gas duct at the recirculation feed position,
   wherein the dry additive is introduced in a direction opposite to the direction of flow of the flue gas upstream of the widened section.

2. The process according to claim 1, wherein the dry addictive is introduced into the flue gas with a relative velocity of at least 30 m/s.

3. The process according to claim 1, wherein the flue gas is cooled and/or humidified by injection or atomization of water into the flue gas stream independently of the introduction of the dry additive.

4. The process according to claim 3, wherein the water is introduced with a pre-set maximum drop size.

5. The process according to claim 4, wherein the maximum drop diameter is less than 200 μm.

6. The process according to claim 1, wherein with respect to a cross section of the flue gas duct the dry additive is introduced at a plurality of locations distributed over the cross section.

7. The process according to claim 1, wherein the dry additive is introduced at a plurality of locations positioned along the direction of flow of the flue gas.

8. The process according to claim 1, wherein the dry additive is introduced via at least one lance.

9. The process according to claim 1, wherein the flue gas is cooled and/or humidified by injection or atomization of suspension or solution.

10. The process according to claim 1, wherein the dry additive comprises an adsorbent introduced as a function of a level of condensable organic compounds and/or heavy metals in the flue gas.

11. The process according to claim 1, wherein reagent is introduced and/or the flue gas is cooled and/or humidified as a function of a level of acidic constituents in the flue gas.

12. A flue gas treatment apparatus for introducing a dry additive to flue gas of a sintering plant, the apparatus comprising:
   a flue gas duct configured to be connected to the sintering plant and to lead the flue gas from the sintering plant in a flue gas flowing direction, the flue gas duct including a widened section having a diameter greater than an immediately preceding portion and an immediately following portion of the flue gas duct;
   a feed device configured to introduce the dry additive into the flue gas at a first feed position and at a second feed position of the flue gas duct away from the widened section;

a fabric filter positioned at an opening of the flue gas duct and configured to separate out at least a recirculation portion of the dry additive;

a returning device positioned and configured to return the recirculation portion of the dry additive to the flue gas duct at a recirculation feed position of the flue gas duct, wherein the first feed position and the second feed position are arranged upstream and downstream, respectively, of the widened portion, and the first feed position and the second feed position are positioned and configured to introduce the dry additive in a direction opposite to the flue gas flowing direction, the first and second feed positions being at a portion of the flue gas duct upstream of the recirculation feed position.

13. The apparatus according to claim 12, wherein in at least one longitudinal cross section of the flue gas duct the first feed position and the second feed position are arranged at a plurality of locations distributed over the cross section.

14. The apparatus according to claim 12, wherein the feed device includes at least one lance for introducing the dry additive.

15. The apparatus according to claim 12, wherein widened section comprises a feed configured to supply water, suspension or solution with a defined maximum drop size to the flue gas duct.

16. The apparatus according to claim 12, further comprising a control unit configured to control supplying of a first quantity of water, a second quantity of suspension or solution, a third quantity of the recirculation portion of the dry additive and a fourth quantity of the dry additive fresh to the apparatus, wherein the control unit is configured to be operable to control each of the first, second, third and fourth quantities independently of remaining quantities of the first, second, third and fourth quantities as a function of a condition of the flue gas.

17. The apparatus according to claim 12, wherein the dry additive is a material comprising one or more of a group consisting of an adsorbent and a reagent.

18. The apparatus according to claim 12, wherein the feed device is configured to introduce the dry additive to the flue duct so that a relative velocity between the dry additive and the flue gas is at least 30 m/s.

19. The process according to claim 1, wherein the dry material is introduced at the feed position different from the recirculation feed position.

20. The process of claim 1, wherein the feed position is arranged upstream of the recirculation feed position.

* * * * *